(12) United States Patent
Tsutsumi

(10) Patent No.: US 11,730,295 B2
(45) Date of Patent: Aug. 22, 2023

(54) KITCHEN KNIFE HOLDER AND KITCHEN KNIFE HOLDER UNIT

(71) Applicant: Yasuhiro Tsutsumi, Kumamoto (JP)

(72) Inventor: Yasuhiro Tsutsumi, Kumamoto (JP)

( * ) Notice: Subject to any disclaimer, the term of this patent is extended or adjusted under 35 U.S.C. 154(b) by 307 days.

(21) Appl. No.: 17/282,556

(22) PCT Filed: Dec. 4, 2020

(86) PCT No.: PCT/JP2020/045264
§ 371 (c)(1),
(2) Date: Apr. 2, 2021

(87) PCT Pub. No.: WO2021/260968
PCT Pub. Date: Dec. 30, 2021

(65) Prior Publication Data
US 2022/0183486 A1    Jun. 16, 2022

(30) Foreign Application Priority Data
Jun. 27, 2020  (JP) ................................. 2020-111000

(51) Int. Cl.
*A47G 21/14* (2006.01)
(52) U.S. Cl.
CPC .................................. *A47G 21/14* (2013.01)
(58) Field of Classification Search
CPC ...... A47G 2/14; A47G 1/17; F16B 2001/0035
USPC ... 248/37.3, 37.6, 117.1, 117.2, 117.4, 206.5
See application file for complete search history.

(56) References Cited

U.S. PATENT DOCUMENTS

| 4,497,412 | A | * | 2/1985 | Labelle | A47G 21/14 211/DIG. 1 |
| 5,775,518 | A | * | 7/1998 | Connor | A47G 21/14 248/37.3 |
| 7,249,683 | B2 | * | 7/2007 | Smith | A47J 45/02 211/70.7 |
| 7,422,180 | B2 | * | 9/2008 | Tang | A47G 21/14 248/176.1 |

(Continued)

FOREIGN PATENT DOCUMENTS

| JP | H4-49029 U1 | 4/1992 |
| JP | H4-40622 Y2 | 9/1992 |

(Continued)

OTHER PUBLICATIONS

International Search Report issued in PCT/JP2020/045264 dated Jan. 12, 2021 with English Translation (5 pages).

(Continued)

*Primary Examiner* — Anita M King
(74) *Attorney, Agent, or Firm* — Nakanishi IP Associates, LLC

(57) ABSTRACT

A kitchen knife holder has a configuration including: a holder body for suspending a kitchen knife entirely by holding a top of a spine of the kitchen knife; and a magnet array attached to the holder body. The holder body includes two or more magnets spaced at an interval and arranged in an array pattern, and used for magnetically supporting the top of the spine of the kitchen knife in a manner allowing the top to be attached and detached freely. The magnet array is arranged at a substantially center position of the holder body in a width direction as viewed from one end of the holder body.

4 Claims, 7 Drawing Sheets

(56) References Cited

U.S. PATENT DOCUMENTS

| | | | | |
|---|---|---|---|---|
| 2008/0060204 A1* | 3/2008 | Chen | ............ | A47G 21/14 30/298.4 |
| 2009/0106982 A1* | 4/2009 | Kushner | ............ | A47G 21/14 30/142 |
| 2011/0226714 A1* | 9/2011 | Huentelman | ............ | A47J 47/16 211/70.7 |

FOREIGN PATENT DOCUMENTS

| | | |
|---|---|---|
| JP | 2003-111632 A | 4/2003 |
| JP | 3149759 U | 4/2009 |
| JP | 2018-138064 A | 9/2018 |

OTHER PUBLICATIONS

Written Opinion of International Searching Authority issued in PCT/JP2020/045264 dated Jan. 12, 2021 with English Translation (5 pages).

\* cited by examiner

KITCHEN KNIFE HOLDER AND KITCHEN KNIFE HOLDER UNIT

TECHNICAL FIELD

The present invention relates to a kitchen knife holder and a kitchen knife holder unit for holding a kitchen knife.

BACKGROUND ART

As self-restrained life has been forced in Japan by the recent pandemic outbreak of novel coronavirus, opportunities for cooking at home have been increased while the frequency of dining out has been reduced. Cooking is a technique of making several types of food materials easy to eat and improving the tastes of these food materials by cutting the food materials first into sizes and applying process on the food materials such as boiling, baking, or stir-frying, for example. In many cases, during the cooking, several types of main dishes or side dishes are prepared at the same time. For this reason, in a usual case, while a step such as boiling, baking, or stir-frying proceeds, a food material for a different dish is cut into sizes. In this case, complicated works such as boiling, tasting, addition of seasoning, and stirring of a food material being boiled should be done at the same time, parallel to each other in a kitchen. Instantaneous motion is frequently required, particularly during heating of a food material. Each time such motion is made during cooking, a kitchen knife used for cutting a food material into sizes should unavoidably be returned to a storage unit at a back surface of a door under a sink or at a drawer, for example. This may cause spilling of a food material being cooked out of a utensil or cause the trouble of accidentally damaging a finger. Patent literature 1 provides conventional suggestion for a kitchen sterilizing and storage tool including a storage unit for a kitchen knife.

PRIOR ART LITERATURES

Patent Literatures

Patent Literature 1: Publication of Japanese Utility Model Registration No. 3149759

SUMMARY OF INVENTION

Problem to be Solved by Invention

The kitchen sterilizing and storage tool of patent literature 1 includes a box-shaped sterilizing lamp storage unit having one side where an opening for insertion of tableware is formed, and a kitchen knife storage case is provided as a lateral utensil storage unit (3) (the sign (3) is used only in the description of the prior art literature) on a lateral side of the sterilizing lamp storage unit. The lateral utensil storage unit of patent literature 1 is configured to magnetically attract and attach a lateral side portion of a kitchen knife under a top of a spine of the kitchen knife using a magnet attached to an upper end corner of the inner wall of the case as the utensil storage unit. While this allows size reduction of the lateral utensil storage unit itself, more attention is required in putting the kitchen knife in and out of the storage unit to cause difficulty in concentrating on cooking. There is also a disadvantage that making tight contact of the lateral side portion of the kitchen knife with the magnet makes a food material and the storage tool come into contact with each other, causing an unfavorable issue for hygienic reasons.

The present invention has been made in view of the conventional problem described above, and one object of the present invention is to provide a kitchen knife holder capable of storing and holding a kitchen knife stably even if the kitchen knife is handled roughly while being stored and taken out frequently during cooking.

Means of Solving Problem

To solve the foregoing problem, the present invention is configured as a kitchen knife holder 1 comprising: a holder body 10 for suspending a kitchen knife h entirely by holding a top t of a spine bh of the kitchen knife; and a magnet array 50 attached to the holder body 10, including two or more magnets 52 spaced at an interval and arranged in an array pattern, and used for magnetically supporting the top t of the spine of the kitchen knife in a manner allowing the top t to be attached and detached freely, wherein the magnet array 50 is arranged at a substantially center position of the holder body 10 in a width direction as viewed from one end of the holder body.

In this configuration, the holder body 10 may include a thin part 14 to which the magnet array 50 is attached.

The present invention is also configured as a kitchen knife holder unit 20 comprising: the kitchen knife holder 1 according to claim 1; and a stand unit 30 for supporting the kitchen knife holder 1 in a horizontally elongated state at an intended height position from a base table 31.

In the kitchen knife holder unit 20, the stand unit 30 for supporting the kitchen knife holder 1 in the horizontally elongated state at the intended height position from the base table 31 may include a rotary arm rotatable vertically or horizontally.

Advantageous Effects of Invention

Even if a kitchen knife is required to be stored and taken out frequently, the kitchen knife holder and the kitchen knife holder unit according to the present invention still allow the kitchen knife to be held at a predetermined position through rough and rapid motion, while preventing spilling of a food material out of a utensil or preventing accidental damage of a finger.

EMBODIMENTS FOR CARRYING OUT INVENTION

An embodiment of a kitchen knife holder and an embodiment of a kitchen knife holder unit according to the present invention will be described below by referring to the accompanying drawings.

Figure 1:
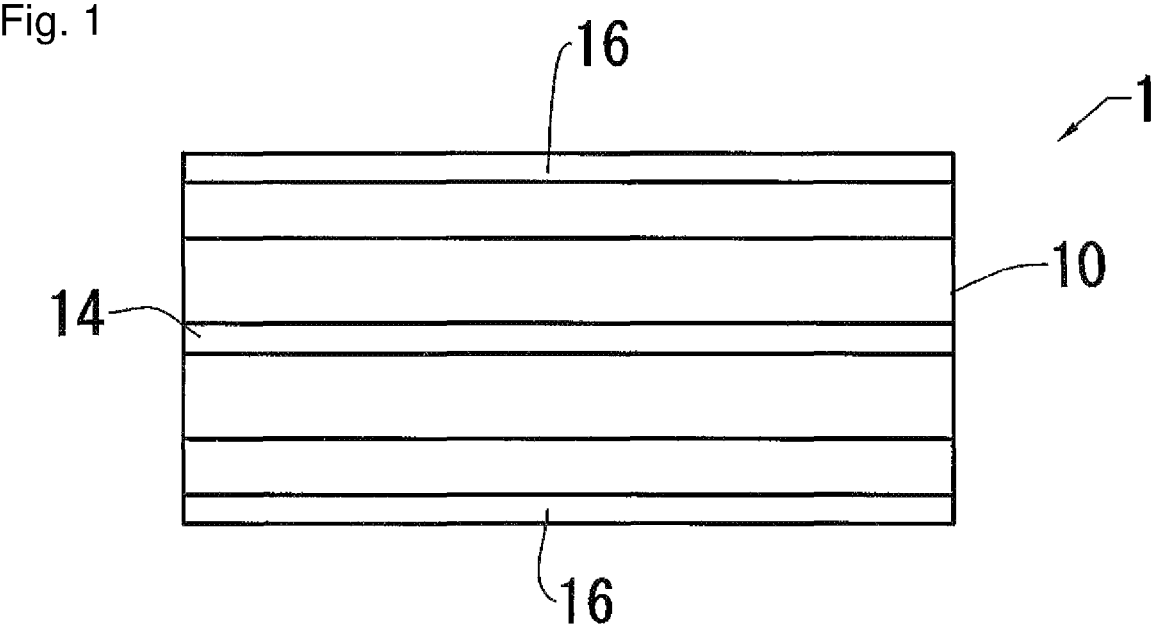
FIG. 1 is a schematic plan view of a kitchen knife holder according to an embodiment of the present invention.
Figure 2:
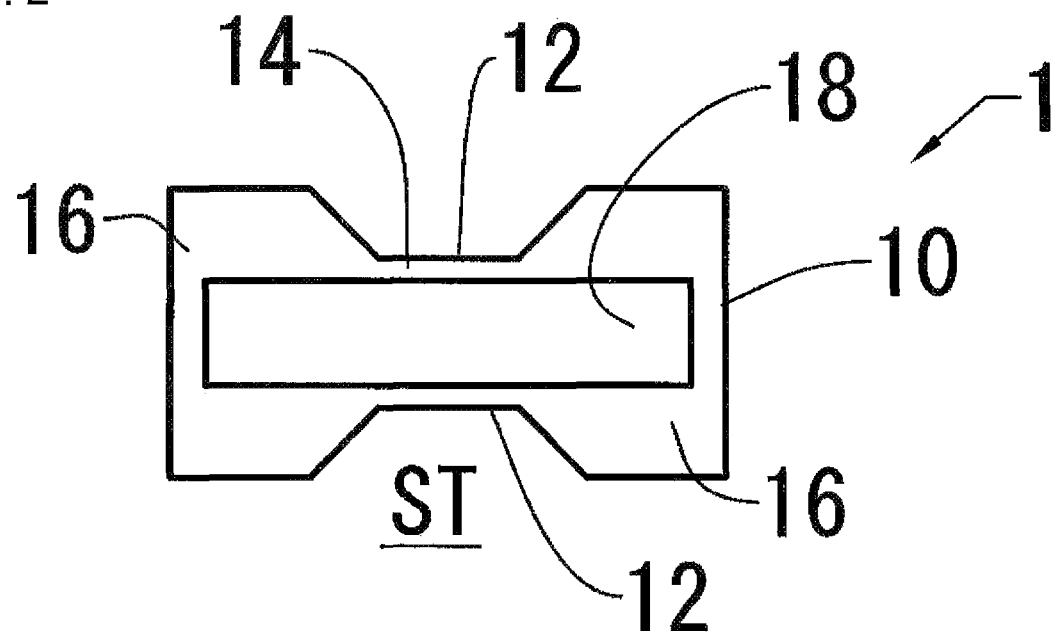
FIG. 2 is an end view of the kitchen knife holder shown in FIG. 1.
Figure 3:
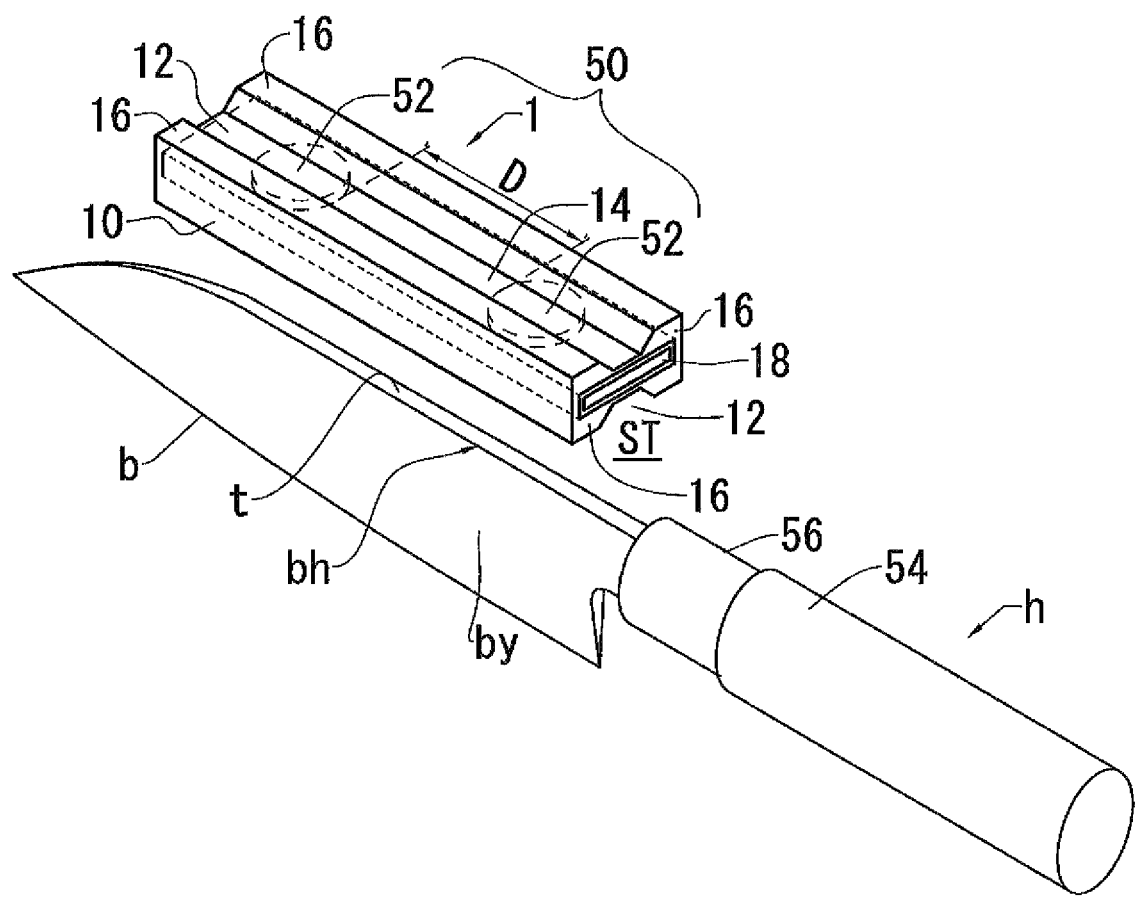
FIG. 3 is a perspective explanatory view showing a relative position of a kitchen knife to be fitted to the kitchen knife holder.
Figure 4:
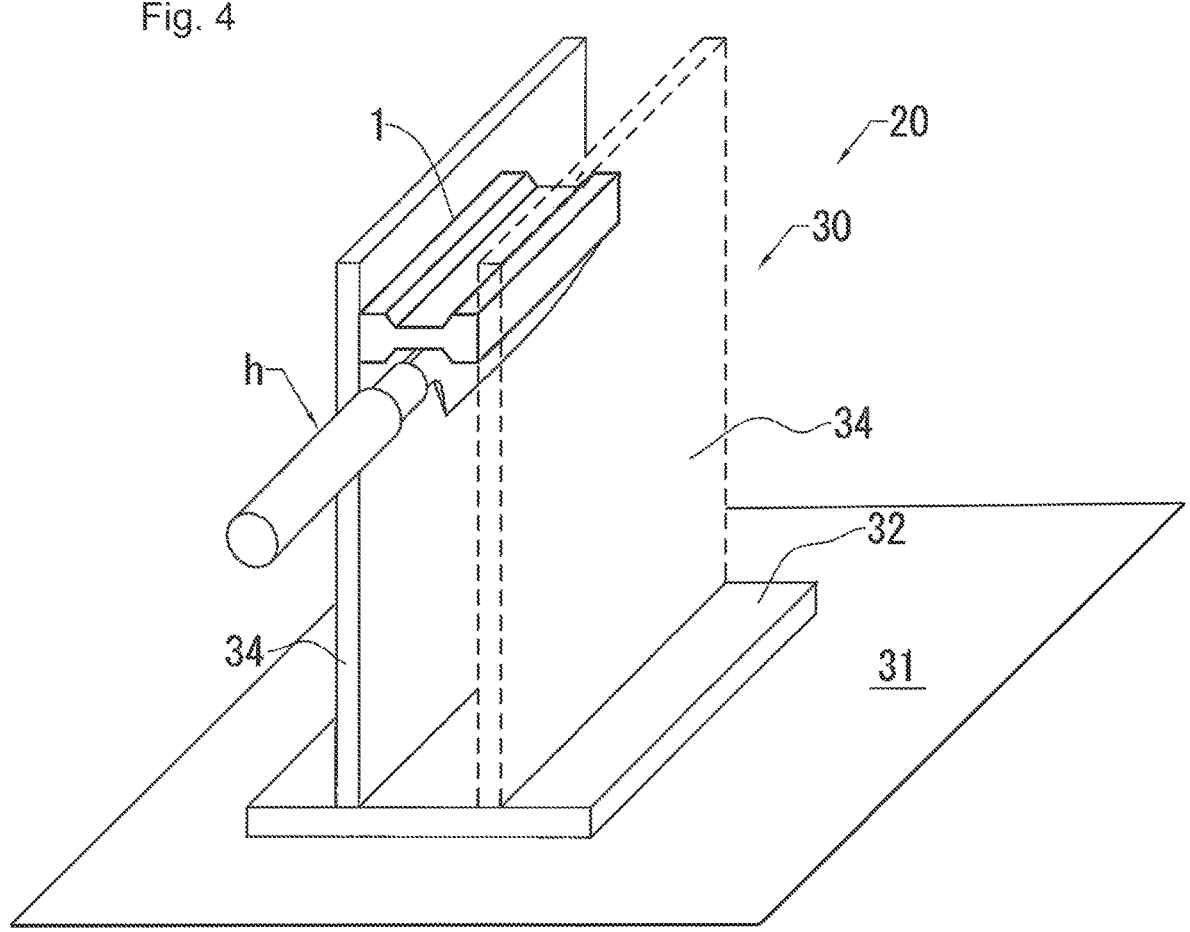
FIG. 4 is an overall perspective explanatory view of a kitchen knife holder unit according to a second embodiment of the present invention.
Figure 5:
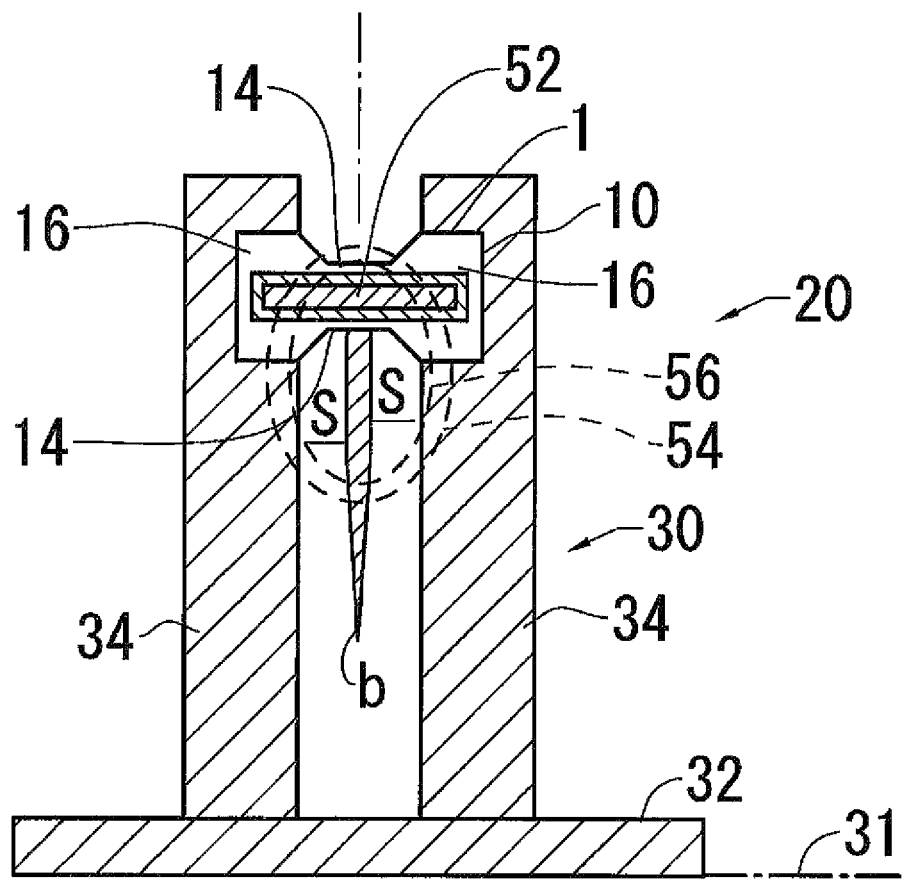
FIG. 5 is a vertical sectional view of the kitchen knife holder unit shown in FIG. 4.
Figure 6:
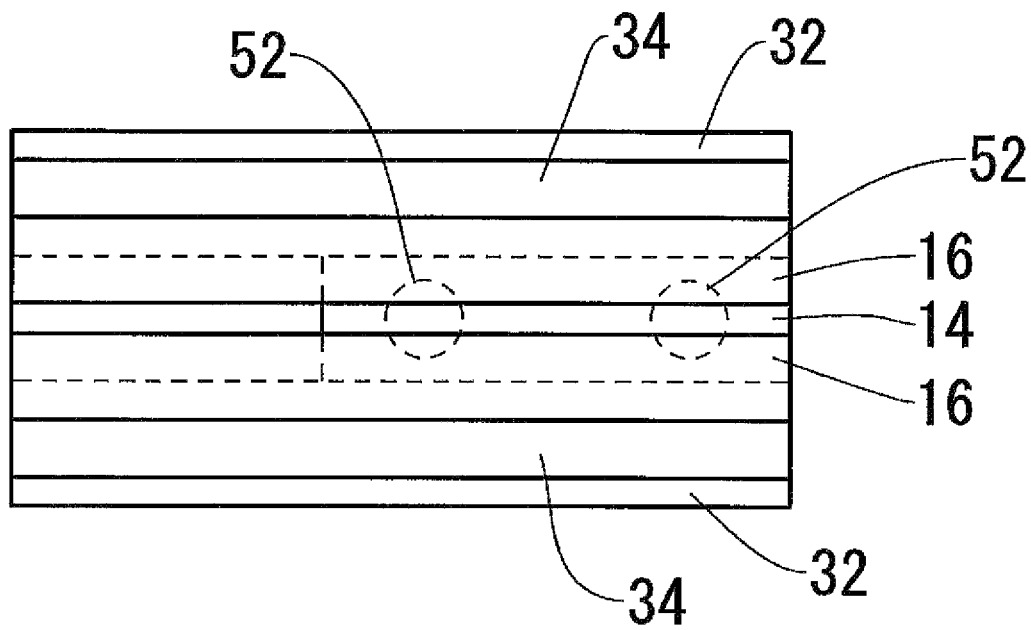
FIG. 6 is a plan view of the kitchen knife holder unit shown in FIG. 4.
Figure 7:
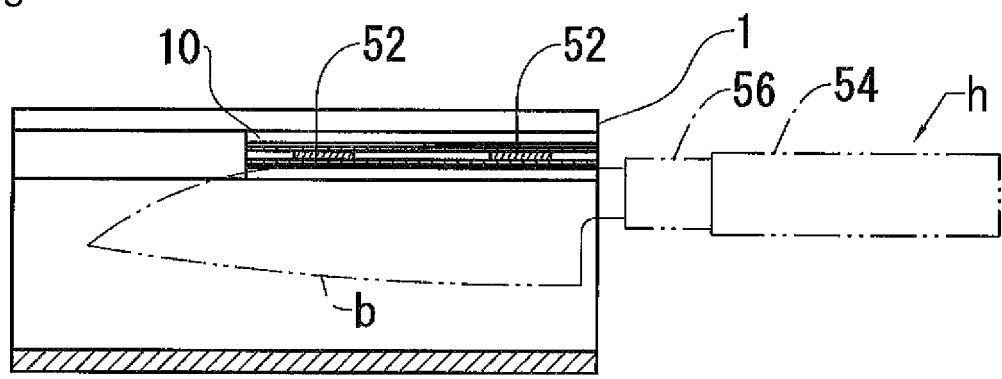
FIG. 7 is a longitudinal sectional view taken in a lengthwise direction of a holder body of the kitchen knife holder unit shown in FIG. 4.

FIGS. 1 to 3 schematically show the configuration of the kitchen knife holder according to the present invention. In the drawings, a kitchen knife holder 1 includes a holder body 10 and a magnet array 50 provided at the holder body 10.

The holder body 10 is a main body of the kitchen knife holder forming a skeleton of the kitchen knife holder to suspend a kitchen knife entirely. According to the embodiment, the holder body 10 is composed of a thick plate-like member extending long in one direction.

A plurality of magnets is attached to the holder body 10 in such a manner as to be arranged in the lengthwise direction as described later. The holder body 10 itself does not exhibit magnetic properties and is made of a material not assuming magnetic force. For example, the holder body 10 can be made of rigid plastic, light metal, ceramic, a wooden or bamboo material, or other types of non-magnetic materials.

As shown in FIGS. 2 and 3, with respective plate surfaces of plate-like members arranged at upper and lower positions, the respective centers of the upper and lower plate surfaces are recessed like grooves extending in the lengthwise direction over the entire lengths of the plate-like members to form recesses 12 of the holder body 10. As a result, as shown in FIG. 2, a shape like an iron dumbbell is defined as viewed from an end surface in which a part sandwiched between the upper and lower recesses 12 at the centers forms a thin part 14, and opposite end sides form an enlarged part 16.

The enlarged part 16 functions as a base for coupling to an angle fitting or an attachment fitting when the holder body 10 is to be attached in a horizontally elongated state to various types of stands or existing lower sections, equipment, etc. of kitchens.

In FIGS. 2 and 3, the holder body 10 has a hole 18 within the thickness of the holder body 10 including the thin part 14. The hole 18 is formed into a shape like a thin plate and extends in the lengthwise direction of the holder body. Permanent magnets 52 of small sizes, for example, are inserted into the hole 18 having a shape like a thin plate from a one-end opening thereof, and the magnets 52 are buried in the holder body 10 while spaced at an intended interval width. A top t of a spine of a kitchen knife h is magnetically attracted to the magnetic field center of each magnet 52. The permanent magnet 52 in the thin part magnetically attracts a top of a spine of the kitchen knife reliably to allow the kitchen knife to be suspended reliably with the edge of the kitchen knife pointed downward. In FIGS. 2 and 3, according to the embodiment, a connection between the lower thin part 14 and the lower enlarged part 16 has a wall surface tilted downward in a direction of expanding the connection to form trapezoidal space ST. Thus, when the top t of the spine of the kitchen knife is magnetically attracted to the center of this space, sufficient clearance S is formed on the opposite sides of the kitchen knife. This makes it possible to hold the kitchen knife reliably at a set position even through rough handling.

The magnet array 50 is magnet means of magnetically supporting the top t of a spine bh of the kitchen knife h in a manner allowing the top t to be attached and detached freely. The magnet array 50 is attached to the holder body 10 and used for suspending the kitchen knife h at the lower surface of the holder body 10 while an edge b of the kitchen knife h is pointed downward. The magnet array 50 includes two or more magnets spaced at an interval in an array pattern, and is used for magnetically supporting the top t of the spine bh of the kitchen knife h in a manner allowing the top t to be attached and detached freely. According to the embodiment, two permanent magnets 52 are attached as the magnet array 50 while spaced from each other at an interval D. Here, 54 is a grip of the kitchen knife and 56 is a ferrule for attaching the main body of the kitchen knife to the grip 54.

According to the embodiment, the magnet array 50 is arranged at a substantially center position of the holder body 10 in a width direction as viewed from one end of the holder body 10. By doing so, when the top t of the spine bh of the kitchen knife h is magnetically attracted and the kitchen knife is suspended with the edge b of the kitchen knife pointed downward, the sufficient clearance S is formed on the opposite sides of a blade by of the kitchen knife. Thus, even if the kitchen knife is put in and out roughly, the blade of the kitchen knife is still prevented from contacting a peripheral wall surface or equipment item, for example, during use of the kitchen knife.

Figure 11:
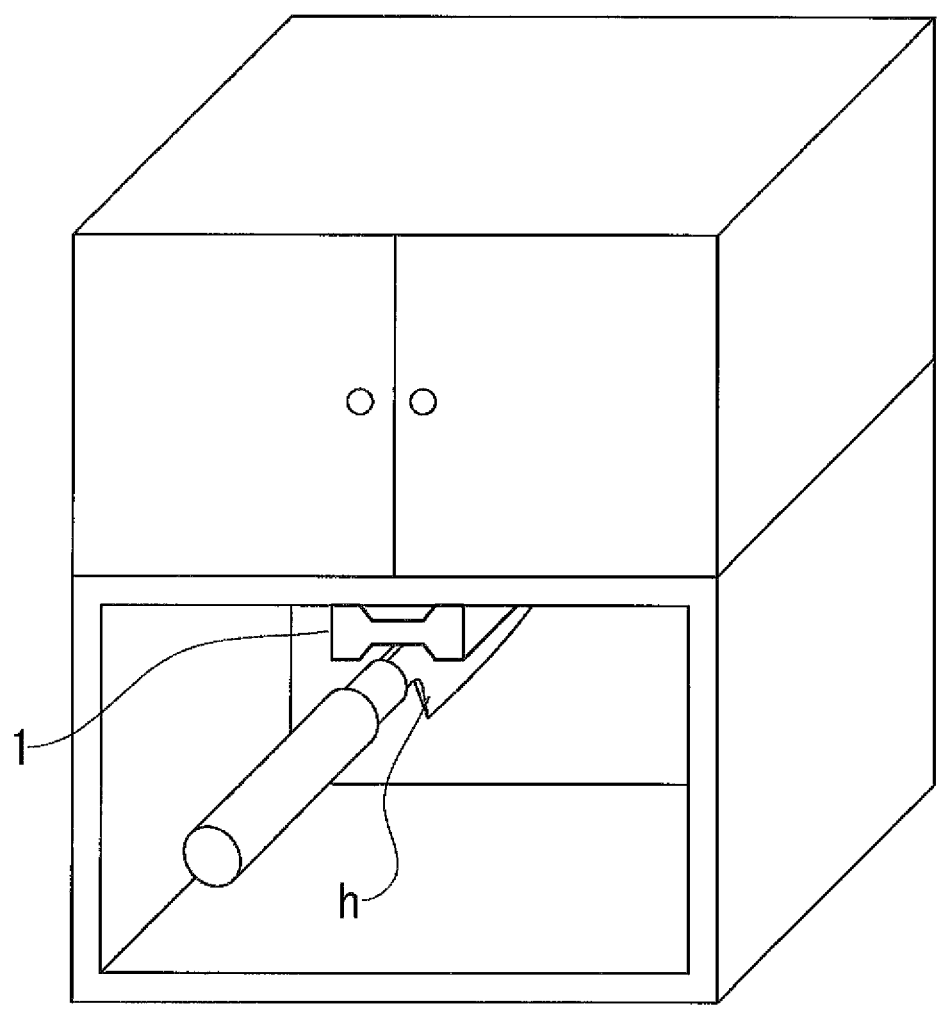
FIG. 11 is an explanatory view showing an example in which the holder body is attached directly to a part of existing kitchen equipment.

The kitchen knife holder 1 can be installed and used at many places in a kitchen using a support stand or frame for supporting the holder body 10. As shown in FIG. 11, a wall section of space, equipment, etc. for storing a kitchen knife can generally be used for directly attaching the kitchen knife holder 1 to an existing wall surface or equipment itself.

A kitchen knife holder unit 20 according to a second embodiment of the present invention will be described next by referring to FIGS. 4 to 10. The kitchen knife holder unit 20 includes the kitchen knife holder 1 described in the first embodiment, and a stand unit 30 for supporting the kitchen knife holder 1 at an intended height position.

The stand unit 30 is height support means of supporting the kitchen knife holder 1 in a horizontally elongated state at an intended height position from a base table 31. In the case of a common Japanese kitchen knife, the stand unit 30 supports this kitchen knife at a height at least greater than the length of a line between the edge and the spine of the kitchen knife (blade width). The base table 31 is a table for placing the unit on a cooking table or a sink in a kitchen, for example.

Referring to FIGS. 4 to 7, at the stand unit 30, parallel plates 34 are fixed parallel to each other in upright positions on a table plate 32, and the kitchen knife holder 1 is fixedly supported in such a manner as to be sandwiched between upper portions of the parallel plates 34. In this case, the enlarged part 16 of the kitchen knife holder 1 is fixed to the inner walls of the parallel plates 34 by required means such as adhesion, fitting, or fastening with screws, for example. At this unit, the top t of the spine of the kitchen knife h is magnetically attracted to the center of the kitchen knife holder 1 in the width direction. In this state, as space is ensured on the opposite sides of the kitchen knife, the edge or blade of the kitchen knife is prevented from directly contacting the inner walls of the parallel plates 34 to maintain hygienic conditions. Furthermore, even if the kitchen knife is put in and out of clearance between the parallel plates roughly, the kitchen knife can still be held with the edge thereof reliably pointed downward. This makes it possible to continue cooking smoothly without the need of interrupting the cooking. Also, trouble such as accidental damage of a finger is prevented.

Figure 8:
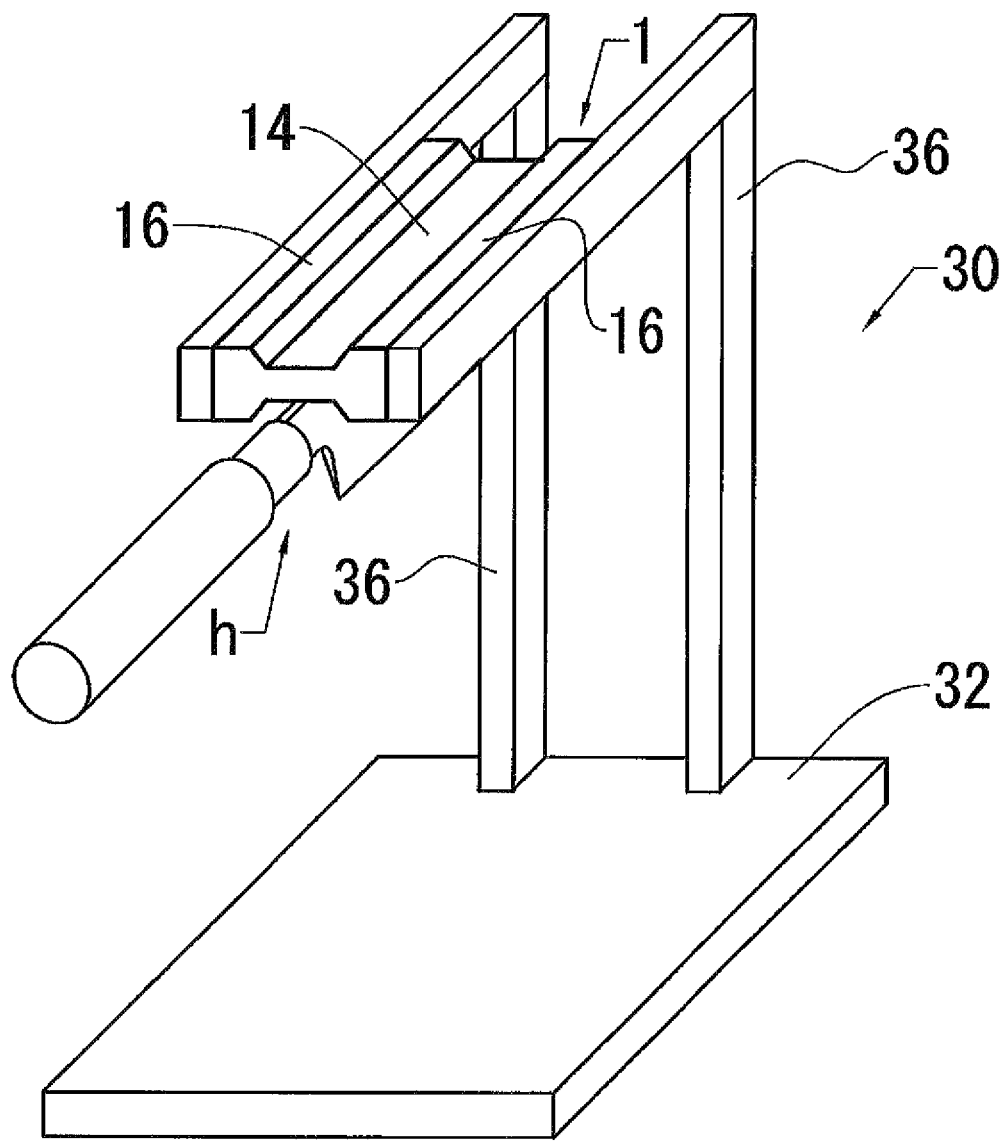
FIG. 8 is a perspective explanatory view showing a different embodiment of the kitchen knife holder unit.
Figure 9:
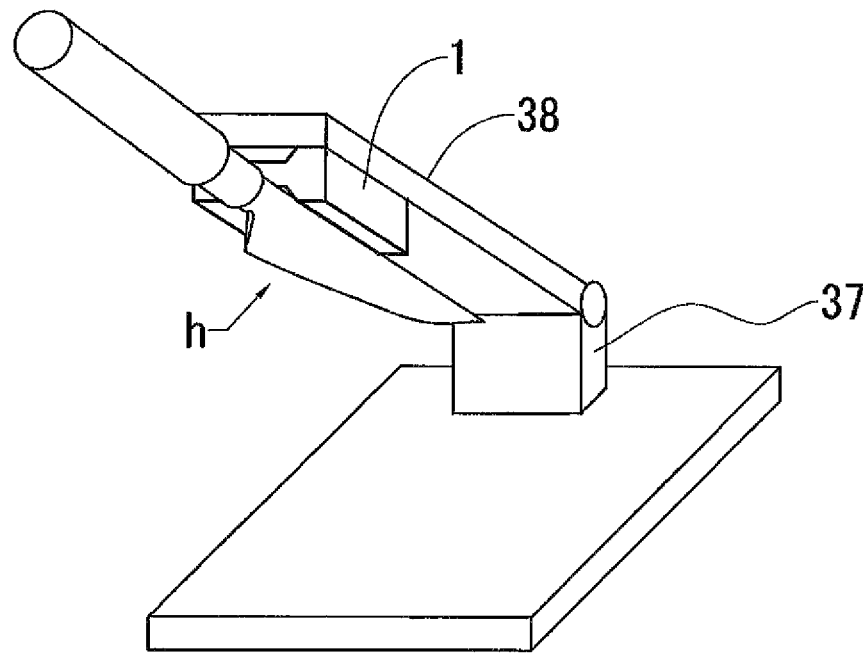
FIG. 9 is a perspective explanatory view showing a different embodiment of the kitchen knife holder unit.
Figure 10:
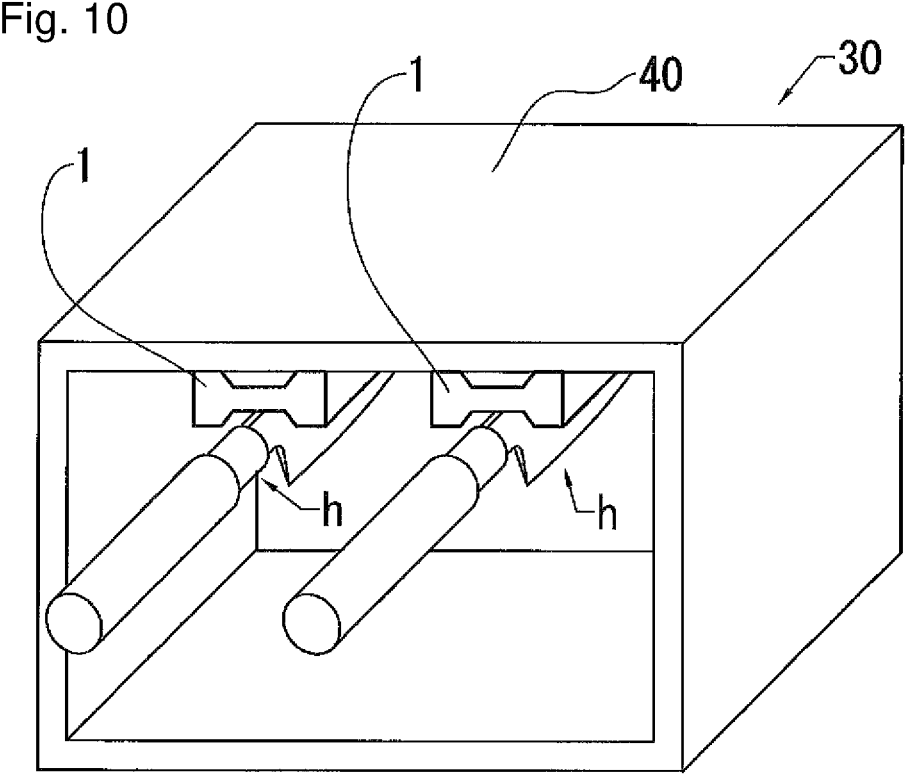
FIG. 10 is a perspective explanatory view showing a different embodiment of the kitchen knife holder unit.

The stand unit 30 may have a configuration of fixedly supporting the kitchen knife holder 1 between respective tips of arms 36 having chevron shapes fixed in upright positions on the table plate 32 as shown in FIG. 8, a configuration of supporting the kitchen knife holder 1 attached to a rotary arm 38 vertically rotatable about a horizontal axis relative to a projecting base column 37 on the table plate 32 as shown in FIG. 9, or a configuration of attaching the kitchen knife holder 1 to an upper inner wall of a hollow case 40 as shown in FIG. 10.

The kitchen knife holder 1 described above includes the holder body 10 and the magnet array 50. The magnet array 50 is arranged at a substantially center position of the holder body in the width direction as viewed from one end of the holder body. By doing so, a top of a spine of a kitchen knife is magnetically supported in a direction along the array of the magnet array. In this state, clearance is formed on the opposite sides of the blade of the kitchen knife. As a result, even if the kitchen knife is put in and out of the holder body with a certain degree of roughness during cooking, for example, it is still possible to suspend the kitchen knife reliably, to prevent a lateral surface of the kitchen knife from contacting a wall surface, etc., and to achieve excellent safety for reason such as preventing unintentional detachment of the kitchen knife.

At the kitchen knife holder unit described above, the kitchen knife holder is supported in a horizontally elongated state at an intended height position from the base table by the stand unit. Thus, while the kitchen knife holder unit is placed in a kitchen or on a table such as a cooking table, the kitchen knife holder becomes available as an independent kitchen knife rest. Furthermore, even if the kitchen knife is put in and out of the holder body with a certain degree of roughness during cooking, for example, it is still possible to suspend the kitchen knife reliably, to prevent a lateral surface of the kitchen knife from contacting a wall surface, etc., and to achieve excellent safety for reason such as preventing unintentional detachment of the kitchen knife.

The kitchen knife holder and the kitchen knife holder unit according to the present invention are not limited only to the configurations described in the foregoing embodiment but other embodiments are also applicable within a range not deviating from the substance of the invention described in CLAIMS.

INDUSTRIAL APPLICABILITY

The kitchen knife holder and the kitchen knife holder unit according to the present invention are installable on kitchens for daily use, places around cooking tables, etc., and are effectively available for cooking of food materials.

REFERENCE SINGS LIST

1 Kitchen knife holder
10 Holder body
14 Thin part
20 Kitchen knife holder unit
30 Stand unit
50 Magnet array
52 Permanent magnet
h Kitchen knife
bh Spine
t Top
b Edge
by Blade
S Clearance

The invention claimed is:

1. A kitchen knife holder comprising:
a holder body for suspending a kitchen knife entirely by holding a top of a spine of the kitchen knife; and
an extending magnet array disposed in the holder body, including two or more magnets spaced at an interval and arranged in an array pattern, and used for magnetically supporting the top of the spine of the kitchen knife in a manner allowing the top to be attached and detached freely,
wherein:
the extending magnet array is arranged at a substantially center position of the holder body in a width direction as viewed from one end of the holder body;
in a cross section crossing the extending magnet array, one of the magnets is surrounded in entirety by the holder body;
the holder body does not exhibit magnetic properties; and
the holder body has a groove extending in an extending direction of the magnet array, the groove being shaped in a reverse trapezoid narrowed toward a bottom of the groove in the cross section.

2. The kitchen knife holder according to claim 1, wherein the holder body includes a thin part to which the magnet array is attached.

3. A kitchen knife holder unit comprising:
the kitchen knife holder according to claim 1; and
a stand unit for supporting the kitchen knife holder in a horizontally elongated state at an intended height position from a base table.

4. The kitchen knife holder unit according to claim 3, wherein
the stand unit for supporting the kitchen knife holder in the horizontally elongated state at the intended height position from the base table includes a rotary arm rotatable vertically with respect to the base table.

\* \* \* \* \*